United States Patent
Hara et al.

(10) Patent No.: US 9,985,258 B2
(45) Date of Patent: May 29, 2018

(54) ONBOARD BATTERY

(71) Applicant: SUBARU CORPORATION, Tokyo (JP)

(72) Inventors: Toshiyuki Hara, Tokyo (JP); Hideki Hasumi, Tokyo (JP); Junya Okamura, Tokyo (JP); Yu Onodera, Tokyo (JP); Yutaka Yokoyama, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 453 days.

(21) Appl. No.: 14/630,385

(22) Filed: Feb. 24, 2015

(65) Prior Publication Data

US 2015/0243950 A1    Aug. 27, 2015

(30) Foreign Application Priority Data

Feb. 25, 2014   (JP) .................................. 2014-033955

(51) Int. Cl.
  *H01M 2/10* (2006.01)
  *B60K 1/04* (2006.01)
(52) U.S. Cl.
  CPC ............ *H01M 2/1083* (2013.01); *B60K 1/04* (2013.01); *H01M 2/1077* (2013.01); *B60K 2001/0416* (2013.01); *H01M 2220/20* (2013.01)

(58) Field of Classification Search
  None
  See application file for complete search history.

(56) References Cited

U.S. PATENT DOCUMENTS

2006/0016633  A1*  1/2006  Fujii ...................... B60R 16/04
                                             180/68.5

FOREIGN PATENT DOCUMENTS

| JP | 2005050616 A | * | 2/2005 | ............... B60K 1/04 |
| JP | 2009274666 A | * | 11/2009 | |
| JP | 5206110 B2 | | 6/2013 | |

* cited by examiner

*Primary Examiner* — Daniel S Gatewood
(74) *Attorney, Agent, or Firm* — McDermott Will & Emery LLP

(57) ABSTRACT

An onboard battery includes an accommodation case that has an upper accommodation unit and a lower accommodation unit positioned below the upper accommodation unit battery modules each having battery cells, and joints that couple the upper accommodation unit and the lower accommodation unit to each other. At least one battery module is accommodated in each of the upper accommodation unit and the lower accommodation unit. When a predetermined load or more is applied to the upper accommodation unit, a stress acts on the joints such that the upper accommodation unit and the lower accommodation unit are separated from each other, and the upper accommodation unit is moved away from the lower accommodation unit.

16 Claims, 15 Drawing Sheets

ONBOARD BATTERY

CROSS-REFERENCE TO RELATED APPLICATIONS

The present application claims priority from Japanese Patent Application No. 2014-033955 filed on Feb. 25, 2014, the entire contents of which are hereby incorporated by reference.

BACKGROUND

1. Technical Field

The present invention relates to the technical field of an onboard battery that is mounted in a vehicle such as an automobile and is provided with a battery module accommodated in an accommodation case.

2. Related Art

In various vehicles such as an automobile, an onboard battery for supplying electric power to a motor and various electrical components is mounted.

These days, vehicles such as, in particular, electric vehicle (EV), hybrid electric vehicle (HEV), and plug-in hybrid electric vehicle (PHEV) are becoming pervasive, and an onboard battery having a high power storage function is mounted on these vehicles that use electricity as power.

The onboard battery is provided with an accommodation case and a battery module accommodated in the accommodation case, and the battery module is configured by arranging a plurality of battery cells (secondary batteries) such as, e.g., nickel-metal hydride batteries and lithium ion batteries. In the onboard battery mounted in the electric vehicle or the like, in order to achieve a high capacity storage function, a plurality of the battery modules is disposed in the accommodation case, and the individual battery cells of the plurality of the battery modules are connected in series or in parallel.

The onboard battery described above includes, as a configuration in which the high power storage function is achieved, an onboard battery in which the battery modules are arranged in upper and lower tiers in the accommodation case (see, e.g., Japanese Patent No. 5206110).

The onboard battery described in Japanese Patent No. 5206110 is disposed in a trunk on the rear side, the battery module in the lower tier is inserted into a disposition depression that is formed in a floor panel so as to be opened upward, and large space is thereby secured in the trunk. The front surface on the side of the lower tier of the accommodation case that accommodates the battery module is formed as an inclined portion that is displaced forward in an upward direction. The lower tier of the onboard battery is positioned between side members (side frames) of a vehicle body.

In the onboard battery described in Japanese Patent No. 5206110, when a large load is applied to the onboard battery from the rear due to a collision of a vehicle, the inclined portion of the accommodation case is guided by a front surface forming the disposition depression, and the entire onboard battery is moved obliquely upward and forward so as to avoid a cross member positioned on the front side of the disposition depression. Consequently, the onboard battery does not collide with the cross member, and an excessive stress to the battery module accommodated in the accommodation case is suppressed.

However, in the onboard battery described in Japanese Patent No. 5206110, in the case where the large load is applied from the rear, the entire onboard battery is moved obliquely upward and forward irrespective of the position of the applied load in a vertical direction. At this point, the inclined portion is guided by the front surface forming the disposition depression. When the inclined portion is guided by the front surface, the inclined potion and the front surface forming the disposition depression come into contact with each other, and hence a reaction force (a component force in a horizontal direction) to the collision is applied to the onboard battery from the front surface.

Consequently, although the excessive stress to the battery module is suppressed by the movement of the onboard battery in the obliquely upward and forward direction, the stress may be applied to each of the battery module in the upper tier and the battery module in the lower tier that are accommodated in the accommodation case depending on the magnitude of the load (the magnitude of the reaction force).

Since the lower tier of the onboard battery is positioned between the side members, in the case where a vehicle such as a passenger car collides, the large load is less likely to be applied to the onboard battery. On the other hand, the position of the upper tier of the onboard battery corresponds to the position of a frame of a large vehicle such as a truck in the vertical direction. Thus, in the case where the large vehicle collides, the large load is applied to the onboard battery. In such case, with the large load, the stress is applied to each of the battery module in the upper tier and the battery module in the lower tier, and the possibility of occurrence of smoking or ignition resulting from damage to the battery module or the like is increased.

SUMMARY OF THE INVENTION

An object of the present invention is to solve the above problem, and reduce the stress to the battery module at the time of the collision of the vehicle to thereby prevent the occurrence of smoking or ignition resulting from the damage to the battery module or the like.

A first aspect of the present invention provides an onboard battery including: an accommodation case that has an upper accommodation unit and a lower accommodation unit positioned below the upper accommodation unit; battery modules each having at least one battery cell, at least one of the battery modules being accommodated in each of the upper accommodation unit and the lower accommodation unit; and at least one joint that couples the upper accommodation unit and the lower accommodation unit to each other. When a predetermined load or more is applied to the upper accommodation unit, a stress acts on the at least one joint such that the upper accommodation unit and the lower accommodation unit are separated from each other, and the upper accommodation unit is moved away from the lower accommodation unit.

One of a pair of side frames of a vehicle equipped with the onboard battery may be positioned on a left and right side of the lower accommodation unit, and the other one of the pair of the side frames of the vehicle may be positioned on a right side of the lower accommodation unit.

Each of the upper accommodation unit and the lower accommodation unit may be structured to have a hollow cross section having a plurality of cavities.

A positive relay and a negative relay may be provided, and at least one of the positive relay and the negative relay may be accommodated in the lower accommodation unit.

The at least joint may have at least one middle portion that is positioned between the upper accommodation unit and the lower accommodation unit, at least one upper protruded coupler that is protruded upward from the middle portion, and at least one lower protruded coupler that is protruded downward from the at least one middle portion. The at least one upper protruded coupler may be coupled to a lower end of the upper accommodation unit. The at least one lower protruded coupler may be coupled to the lower accommodation unit so as to be in contact with either one of a front surface and a rear surface of an upper end of the lower accommodation unit.

The at least one joint may have at least one middle portion that is positioned between the upper accommodation unit and the lower accommodation unit, at least one upper protruded coupler that is protruded upward from the at least one middle portion, and at least one lower protruded coupler that is protruded downward from the at least one middle portion. The at least one lower protruded coupler may be coupled to the upper end of the lower accommodation unit, and the at least one upper protruded coupler may be coupled to the upper accommodation unit so as to be in contact with either one of a front surface and a rear surface of the lower end of the upper accommodation unit.

The at least one joint may include at least one first joint and at least one second joint. The at least one first joint may have at least one middle portion that is positioned between the upper accommodation unit and the lower accommodation unit, at least one upper protruded coupler that is protruded upward from the at least one middle portion, and at least one lower protruded coupler that is protruded downward from the at least one middle portion. The at least one second joint may have at least one middle portion that is positioned between the upper accommodation unit and the lower accommodation unit, at least one upper protruded coupler that is protruded upward from the at least one middle portion, and at least one lower protruded coupler that is protruded downward from the at least one middle portion. The at least one upper protruded coupler of the at least one first joint may be coupled to the lower end of the upper accommodation unit. The at least one lower protruded coupler of the at least one second joint may be coupled to the upper end of the lower accommodation unit, and the at least one lower protruded coupler of the at least one first joint and the upper protruded coupler of the second joint may be coupled to each other in a front and rear direction.

The at least one joint may include at least one first joint and at least one second joint. The at least one first joint may have a at least one middle portion that is positioned between the upper accommodation unit and the lower accommodation unit, at least one upper protruded coupler that is protruded upward from the at least one middle portion, a at least one lower protruded coupler that is protruded downward from the at least one middle portion, and at least one middle protruded coupler that is protruded horizontally from the at least one middle portion. The at least one second joint may have at least one middle portion that is positioned between the upper accommodation unit and the lower accommodation unit, at least one upper protruded coupler that is protruded upward from the at least one middle portion, at least one lower protruded coupler that is protruded downward from the at least one middle portion, and at least one middle protruded coupler that is protruded horizontally from the at least one middle portion. The at least one upper protruded coupler of the at least one first joint may be coupled to the lower end of the upper accommodation unit. The at least one lower protruded coupler of the at least one second joint may be coupled to the upper end of the lower accommodation unit. The at least one middle protruded coupler of the at least one first joint and the at least one middle protruded coupler of the at least one second joint may be coupled to each other in a vertical direction.

An inclined surface that is inclined in the vertical direction may be formed in each of the at least one first joint and the at least one second joint. The at least one first joint and the at least one second joint may be coupled to each other in a state in which the inclined surface of the at least one first joint and the inclined surface of the at least one second joint are in contact with each other.

DETAILED DESCRIPTION

Figure 1:
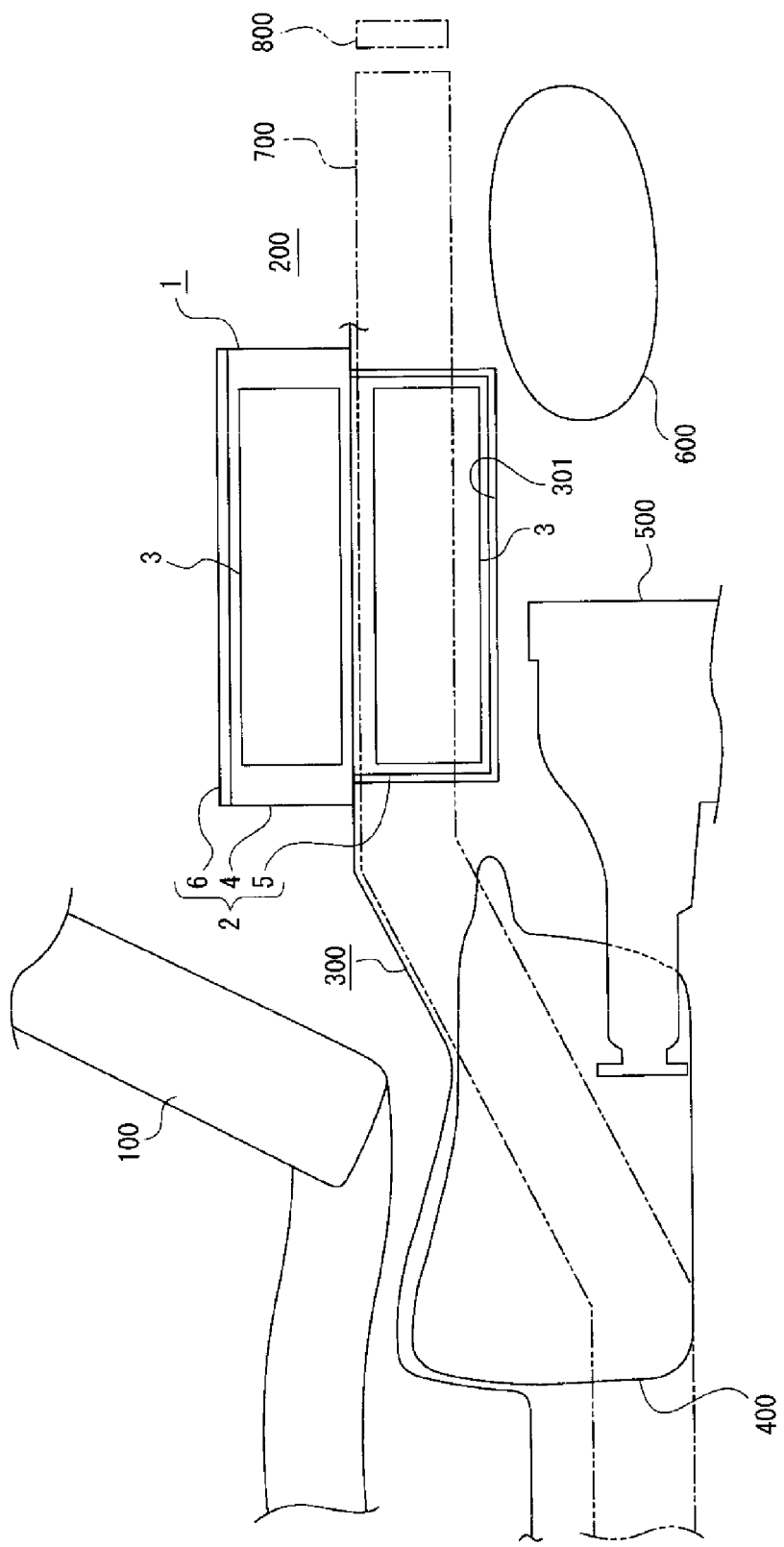
FIG. 1 illustrates an implementation of an onboard battery of the present invention together with FIGS. 2 to 15, and is a conceptual view illustrating a state in which the onboard battery is mounted in a trunk.

Hereinbelow, an implementation for carrying out an onboard battery of the present invention will be described with reference to the accompanying drawings.

An onboard battery 1 has an accommodation case 2 and battery modules 3, 3, . . . (see FIGS. 1 and 2). The accommodation case 2 has an upper accommodation unit 4 that is opened upward, a lower accommodation unit 5 that is positioned below the upper accommodation unit 4 and is opened upward, and a flat lid 6 that closes the opening of the upper accommodation unit 4 from above. In the upper accommodation unit 4, for example, four battery modules 3, 3, . . . are accommodated so as to be arranged in a left and right direction and, in the lower accommodation unit 5, for example, two battery modules 3 and 3 are accommodated so as to be arranged in the left and right direction or in a front and rear direction.

The onboard battery 1 is disposed in an upper portion of a vehicle body floor 300 in a trunk 200 positioned behind a rear seat 100 of a vehicle (see FIG. 1). A disposition depression 301 that is opened upward in the trunk 200 is formed in the vehicle body floor 300. Under the vehicle body floor 300, a fuel tank 400, rear suspensions 500 and 500, and a muffler 600 are positioned. The fuel tank 400 is positioned below the rear seat 100.

The onboard battery 1 is disposed in the trunk 200 in a state in which a lower tier including the lower accommodation unit 5 is inserted into the disposition depression 301 in the vehicle body floor 300. Consequently, an upper tier including the upper accommodation unit 4 is positioned above the upper surface of the vehicle body floor 300.

Side frames 700 and 700 that serve as the framework of the vehicle body and extend in the front and rear direction are positioned immediately laterally to the lower tier of the onboard battery 1, and the rear ends of the side frames 700 and 700 are positioned at the rear of the onboard battery 1. A bumper beam 800 that extends in the left and right direction is disposed at the rear of the side frames 700 and 700.

Consequently, when another vehicle having a low height such as a passenger car or the like collides with the vehicle in which the onboard battery 1 is mounted from the rear, the height of each of the side frames 700 and 700 and the bumper beam 800 of the vehicle in which the onboard battery 1 is mounted is substantially equal to the height of each of the side frames and the bumper beam of another vehicle such as the passenger car or the like, and hence an impact is absorbed by the side frames 700 and 700 and the bumper beam 800 at the rear of the onboard battery 1.

Thus, when the vehicle having the low height such as the passenger car or the like collides, since the impact is absorbed by the side frames 700 and 700 and the bumper beam 800, a large load is not applied to the onboard battery 1, a state in which the onboard battery 1 is disposed in the trunk 200 is maintained, and it is possible to protect the onboard battery 1.

Figure 2:
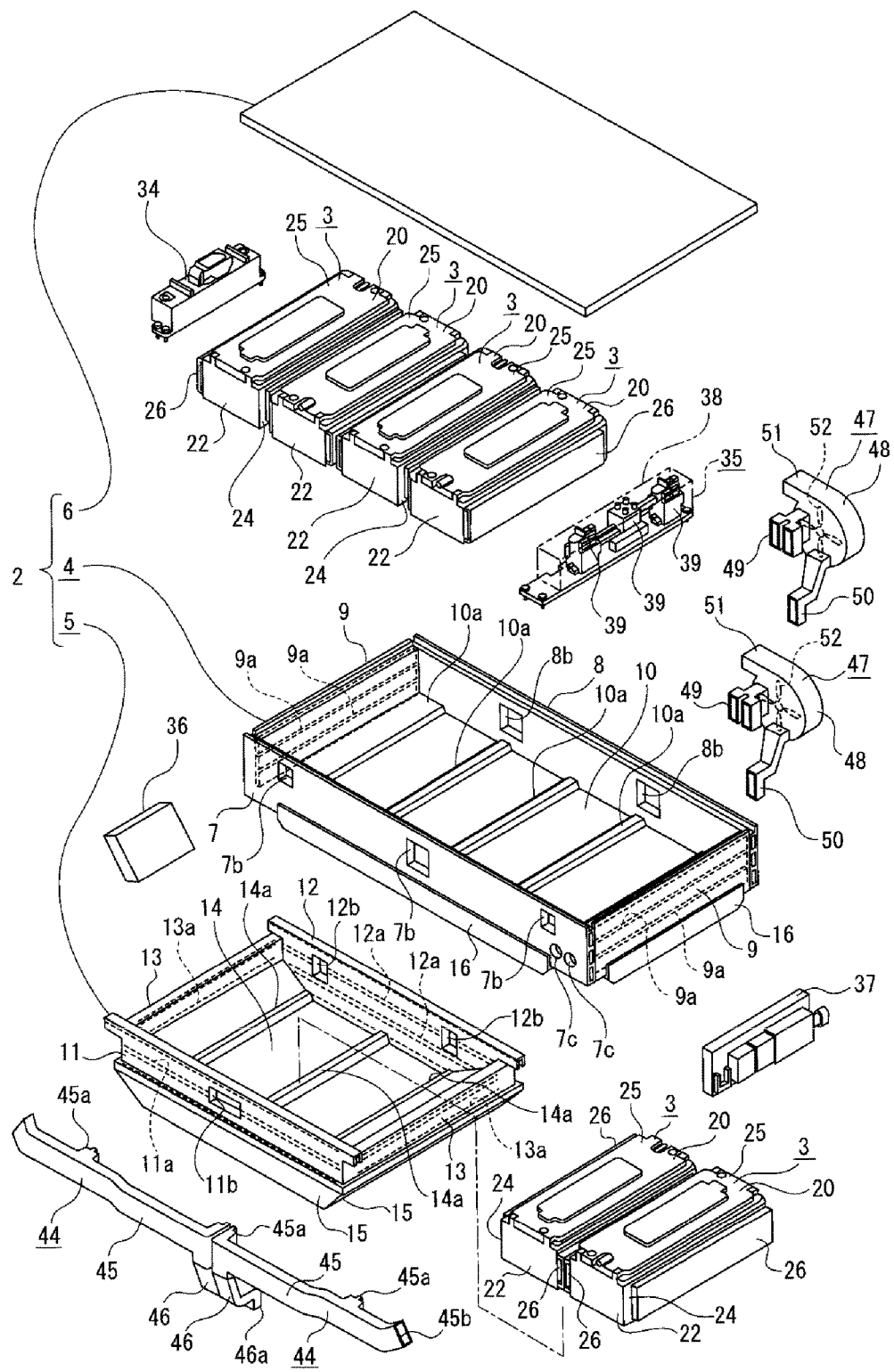
FIG. 2 is a schematic exploded perspective view of the onboard battery.
Figure 3:
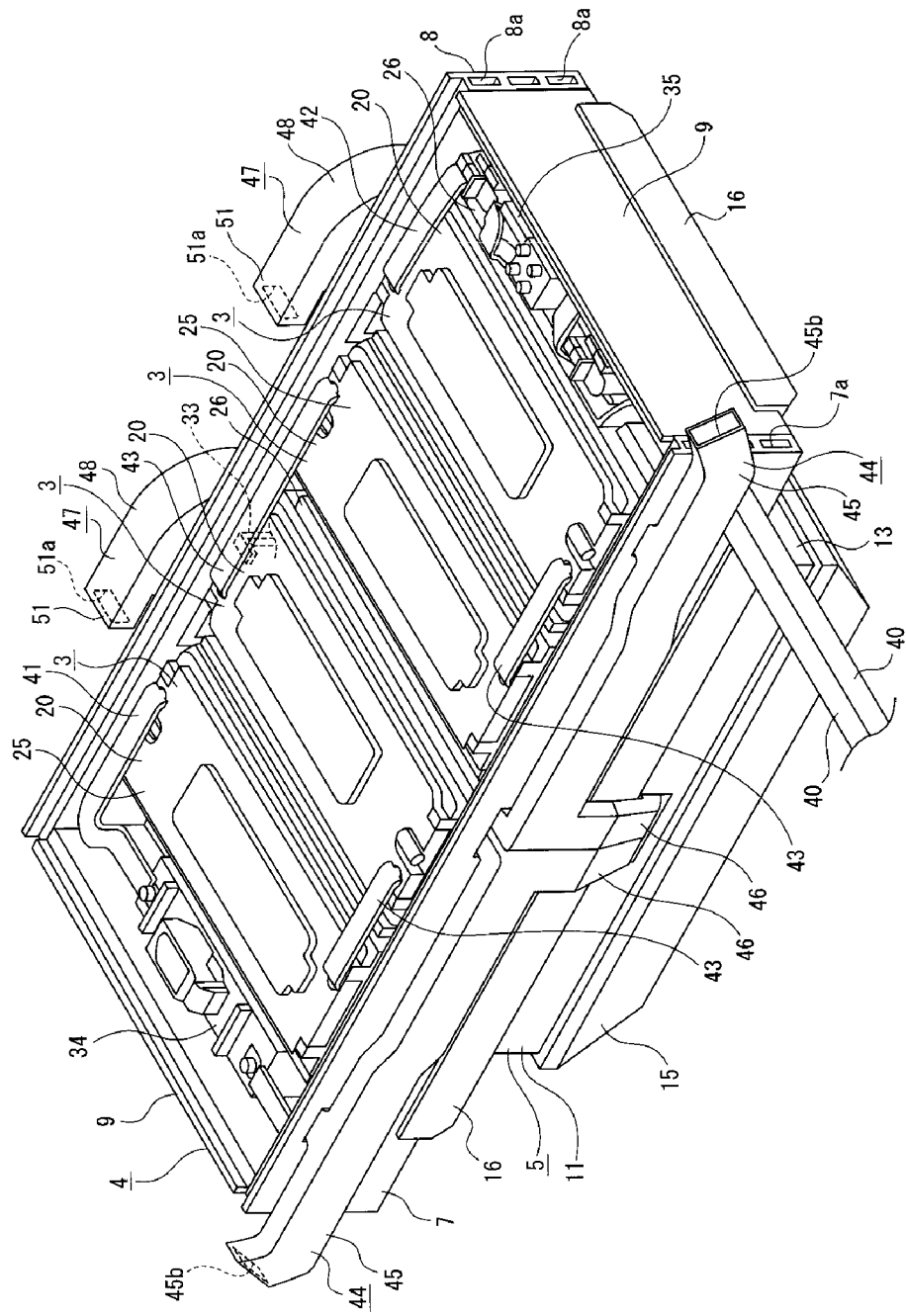
FIG. 3 is a perspective view of the onboard battery.
Figure 4:
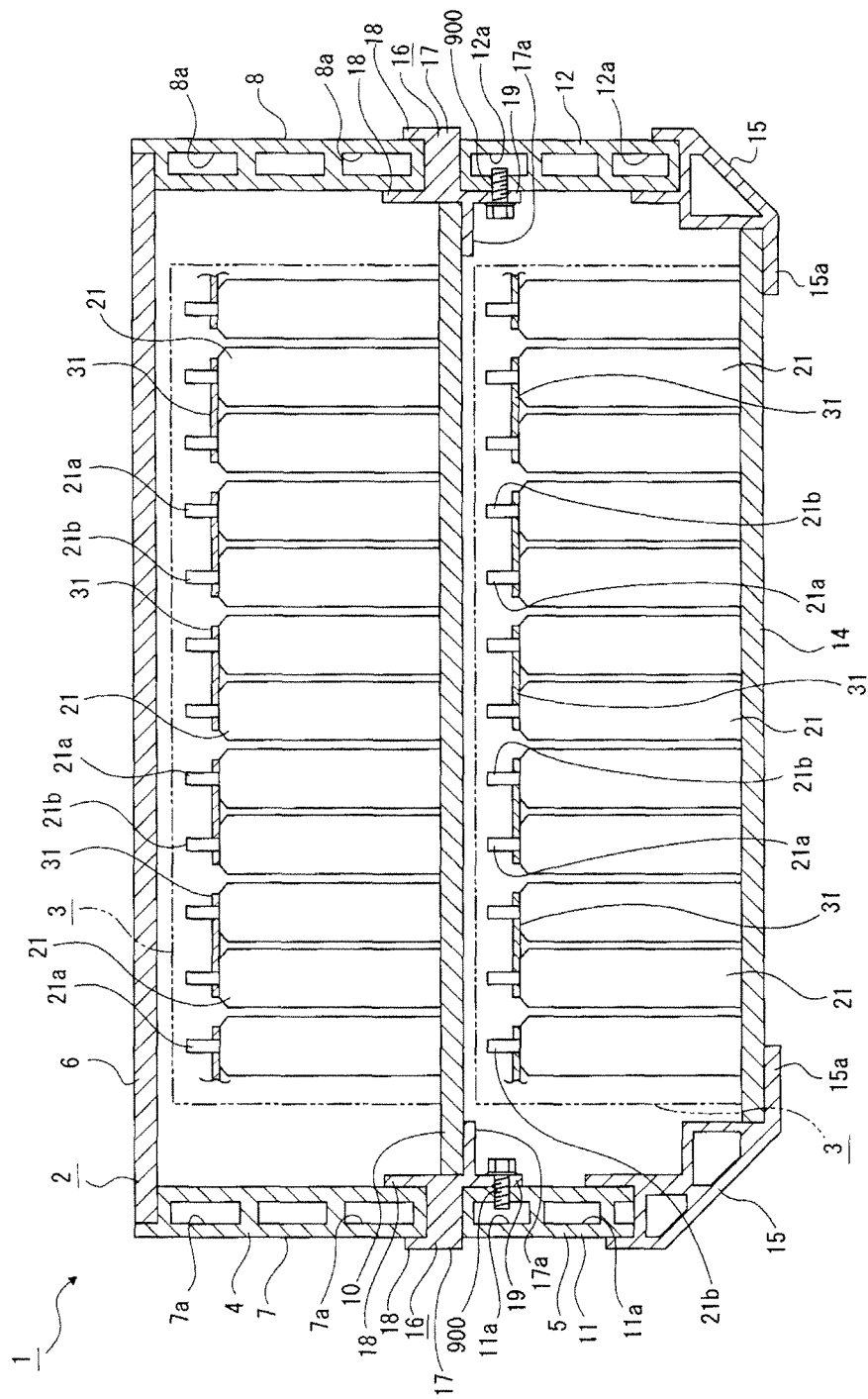
FIG. 4 is a schematic cross-sectional view of the onboard battery.

As illustrated in FIGS. 2 to 4, the upper accommodation unit 4 has an upper front wall 7 that faces in the front and rear direction, an upper rear wall 8 that is positioned on the rear side of the upper front wall 7 and faces in the front and rear direction, upper side walls 9 and 9 that are positioned so as to be spaced apart from each other in the left and right direction, and an inner partition wall 10 that faces in the vertical direction. Each of the upper front wall 7, the upper rear wall 8, and the upper side walls 9 and 9 is formed by extrusion molding of, e.g., aluminum or the like, and has a hollow cross section.

Cavities 7*a*, 7*a*, and 7*a* that extend in the left and right direction and are arranged in the vertical direction are formed in the upper front wall 7. Duct insertion holes 7*b*, 7*b*, and 7*b* are formed in the upper front wall 7 so as to be spaced apart from each other in the left and right direction. Cable insertion holes 7*c* and 7*c* are formed in one end of the upper front wall 7 in the left and right direction.

Cavities 8*a*, 8*a*, and 8*a* that extend in the left and right direction and are arranged in the vertical direction are formed in the upper rear wall 8. Duct insertion holes 8*b* and 8*b* are formed in the upper rear wall 8 so as to be spaced apart from each other in the left and right direction.

Cavities 9*a*, 9*a*, . . . that extend in the front and rear direction and are arranged in the vertical direction are formed in the upper side walls 9 and 9.

The inner partition wall 10 is formed into a substantially rectangular flat shape that faces in the vertical direction. Partition protrusions 10*a*, 10*a*, . . . that extend in the front and rear direction are provided on the upper surface side of the inner partition wall 10 so as to be spaced apart from each other in the left and right direction (see FIG. 2). The partition protrusions 10*a*, 10*a*, . . . are protruded upward.

As illustrated in FIGS. 2 to 4, the lower accommodation unit 5 has a lower front wall 11 that faces in the front and rear direction, a lower rear wall 12 that is positioned on the rear side of the lower front wall 11 and faces in the front and rear direction, lower side walls 13 and 13 that are positioned so as to be spaced apart from each other in the left and right direction, and a bottom wall 14 that faces in the vertical direction. Each of the lower front wall 11, the lower rear wall 12, and the lower side walls 13 and 13 is formed by extrusion molding of, e.g., aluminum or the like, and has a hollow cross section.

Cavities 11*a*, 11*a*, and 11*a* that extend in the left and right direction and are arranged in the vertical direction are formed in the lower front wall 11. A duct insertion hole 11*b* is formed in the central portion of the lower front wall 11 in the left and right direction.

Cavities 12*a*, 12*a*, and 12*a* that extend in the left and right direction and are arranged in the vertical direction are formed in the lower rear wall 12. Duct insertion holes 12*b* and 12*b* are formed in the lower rear wall 12 so as to be spaced apart from each other in the left and right direction.

The lower side walls 13 and 13 are inclined in a direction in which they approach each other in a downward direction. Cavities 13*a*, 13*a*, . . . that extend in the front and rear direction and are arranged in the vertical direction are formed in the lower side walls 13 and 13.

The bottom wall 14 is formed into a substantially rectangular flat shape that faces in the vertical direction. Partition protrusions 14*a*, 14*a*, and 14*a* that extend in the front and rear direction are provided on the upper surface side of the bottom wall 14 so as to be spaced apart from each other in the left and right direction (see FIG. 2). The partition protrusions 14*a*, 14*a*, and 14*a* are protruded upward.

The bottom wall 14 is coupled to the lower front wall 11, the lower rear wall 12, and the lower side walls 13 and 13 with lower joints 15, 15, . . . (see FIGS. 2 and 4). Each of the lower joints 15, 15, . . . is formed by extrusion molding of, e.g., aluminum or the like, and has a hollow cross section.

Receiving protrusions 15*a*, 15*a*, . . . that are protruded inward are provided at the lower ends of the lower joints 15, 15, . . . (see FIG. 4). The outer periphery of the bottom wall 14 is placed on the receiving protrusions 15*a*, 15*a*, . . . of the lower joints 15, 15, . . . , and is coupled to the lower joints 15, 15, . . . .

The upper ends of the lower joints 15, 15, . . . are coupled to the respective lower ends of the lower front wall 11, the lower rear wall 12, and the lower side walls 13 and 13.

Figure 5:
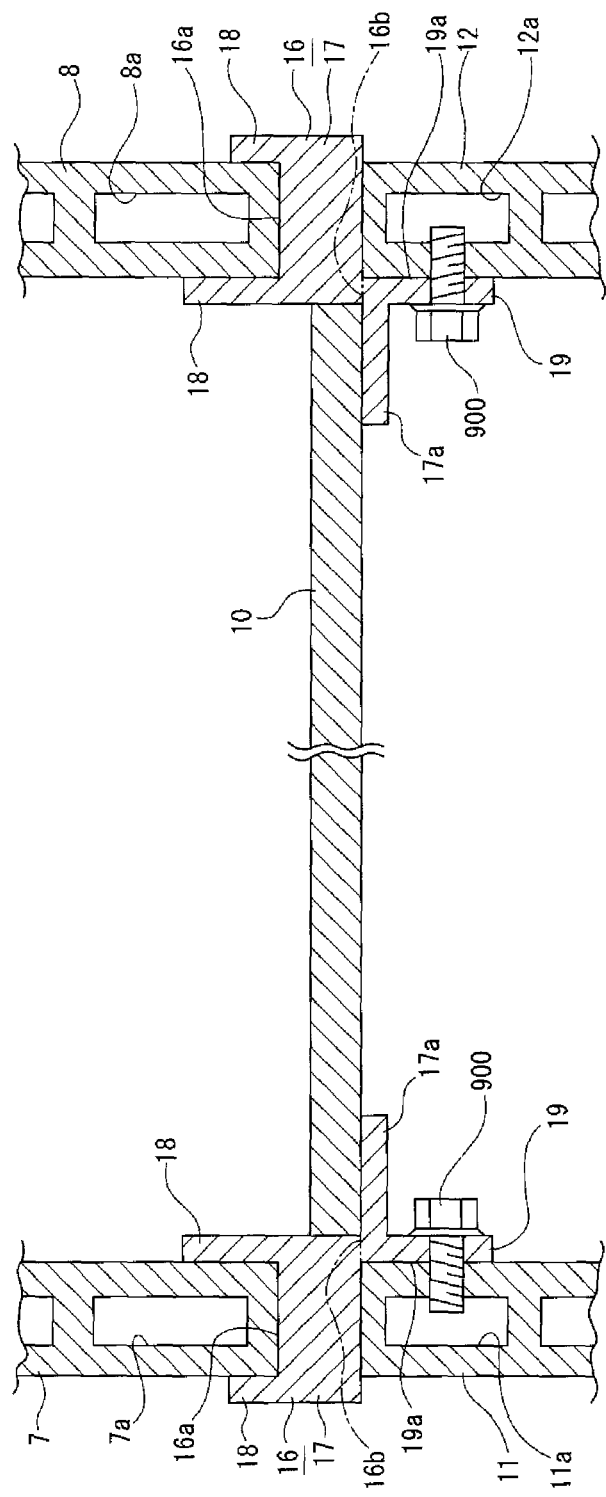
FIG. 5 is an enlarged cross-sectional view illustrating a state in which an upper accommodation unit and a lower accommodation unit are coupled to each other with an upper joint.

The upper accommodation unit 4 and the lower accommodation unit 5 are coupled to each other with upper joints 16, 16, . . . (see FIGS. 2 to 4). Each of the upper joints 16 is formed by extrusion molding of, e.g., aluminum or the like and, as illustrated in FIGS. 4 and 5, the upper joint 16 includes a middle portion 17 that is positioned between the upper accommodation unit 4 and the lower accommodation unit 5, upper protruded couplers 18 and 18 that are protruded upward from the middle portion 17, and a lower protruded coupler 19 that is protruded downward from the middle portion 17.

The thickness of the middle portion 17 is made larger than the thickness of each of the upper front wall 7, the upper rear wall 8, the upper side walls 9 and 9, the lower front wall 11, the lower rear wall 12, and the lower side walls 13 and 13. A receiving protrusion 17*a* that is protruded inward is provided in the middle portion 17.

The upper protruded couplers 18 and 18 are protruded upward from the outer end and the inner end of the middle portion 17 in the front and rear direction or in the left and right direction. Consequently, the upper joint 16 is formed with a fitting depression 16a that is opened upward between the upper protruded couplers 18 and 18.

The lower protruded coupler 19 is protruded downward from the inner end of the middle portion 17 in the front and rear direction or in the left and right direction. The outer surface of the lower protruded coupler 19 is formed as a joint surface 19a.

The lower ends of the upper front wall 7, the upper rear wall 8, and the upper side walls 9 and 9 of the upper accommodation unit 4 are fit in the fitting depressions 16a, 16a, . . . , and the upper joints 16, 16, . . . are thereby coupled to the upper front wall 7, the upper rear wall 8, and the upper side walls 9 and 9. In addition, the upper joints 16, 16, . . . are coupled to the lower front wall 11, the lower rear wall 12, and the lower side walls 13 and 13 with, e.g., attachment screws 900, 900, . . . in a state in which the joint surfaces 19a, 19a, . . . of the lower protruded couplers 19, 19, . . . are in contact with the inner surfaces of the upper ends of the lower front wall 11, the lower rear wall 12, and the lower side walls 13 and 13 of the lower accommodation unit 5.

Note that the upper joints 16, 16, . . . may also be coupled to the lower front wall 11, the lower rear wall 12, and the lower side walls 13 and 13 by, e.g., welding or the like.

As described above, the upper joint 16 is coupled to each of the lower front wall 11, the lower rear wall 12, and the lower side walls 13 and 13 in the state in which only the joint surface 19a of the lower protruded coupler 19 is in contact with each of the lower front wall 11, the lower rear wall 12, and the lower side walls 13 and 13, and the lower protruded coupler 19 is protruded from one end of the middle portion 17. Consequently, a boundary between the middle portion 17 and the lower protruded coupler 19 is formed as a fragile portion 16b having low strength, and the fragile portion 16b can be ruptured when a large load is applied to the onboard battery 1.

Note that the foregoing has described an example in which the joint surfaces 19a, 19a, . . . of the lower protruded couplers 19, 19, . . . are in contact with the inner surfaces of the lower front wall 11, the lower rear wall 12, and the lower side walls 13 and 13 of the lower accommodation unit 5, but the upper joint 16 may also be formed into a shape in which the lower protruded coupler is protruded downward from the outer end of the middle portion 17 in the front and rear direction or in the left and right direction, and the joint surface is in contact with each of the outer surfaces of the lower front wall 11, the lower rear wall 12, and the lower side walls 13 and 13 of the lower accommodation unit 5.

The inner partition wall 10 is coupled to the upper joints 16, 16, . . . with the outer periphery thereof placed on the receiving protrusions 17a, 17a, . . . of the upper joints 16, 16, . . . .

The battery modules 3, 3, . . . that are accommodated in the upper accommodation unit 4 and are positioned in the upper tier in the accommodation case 2 are disposed at positions defined by the partition protrusions 10a, 10a, . . . provided on the inner partition wall 10 in a state in which the battery modules are placed on the upper surface of the inner partition wall 10 (see FIGS. 2 to 4). In addition, The battery modules 3 and 3 that are accommodated in the lower accommodation unit 5 and are positioned in the lower tier in the accommodation case 2 are disposed at positions defined by the partition protrusions 14a, 14a, and 14a provided on the bottom wall 14 in a state in which the battery modules are placed on the upper surface of the bottom wall 14.

Figure 6:
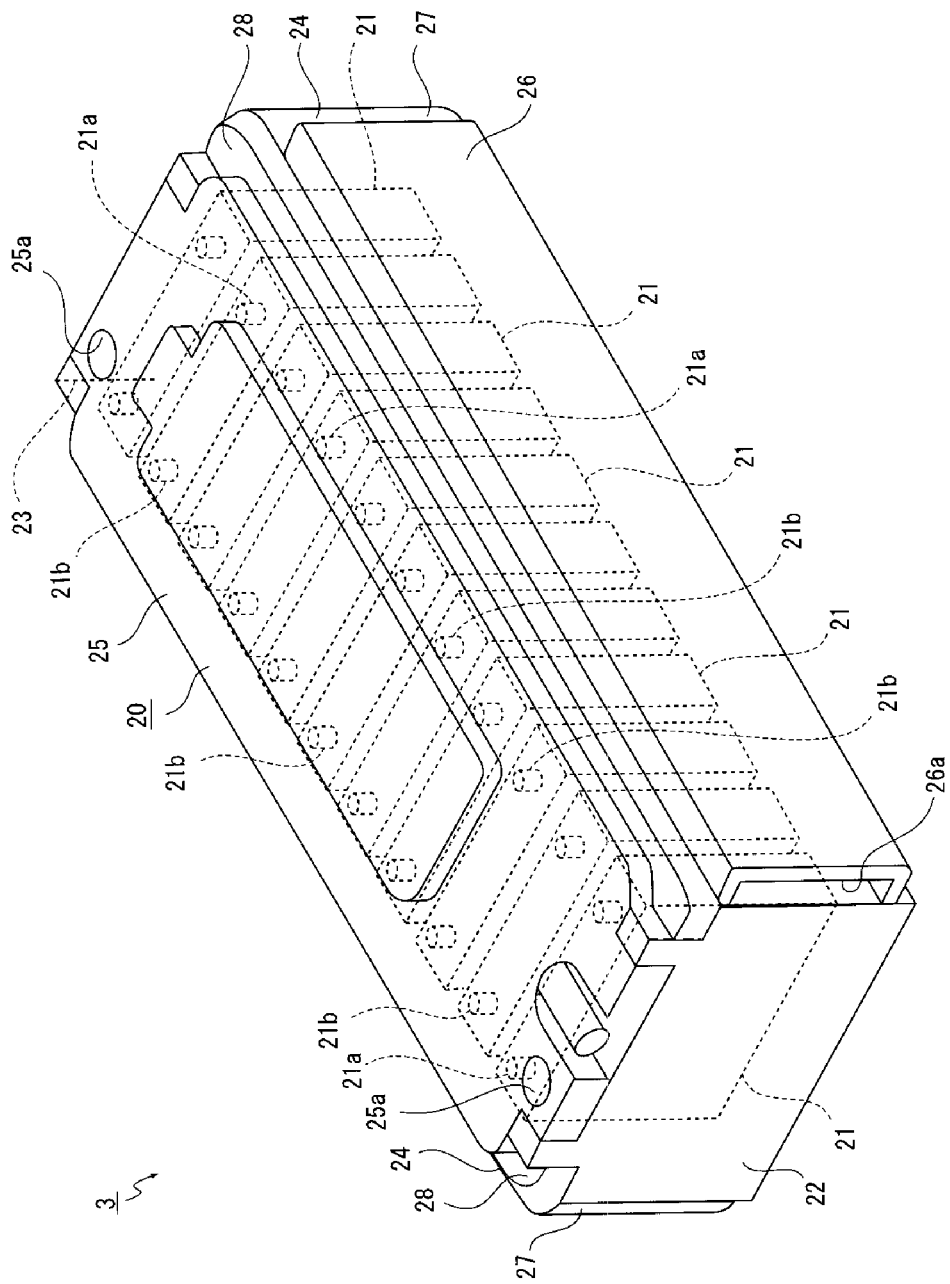
FIG. 6 is a perspective view of a battery module.
Figure 7:
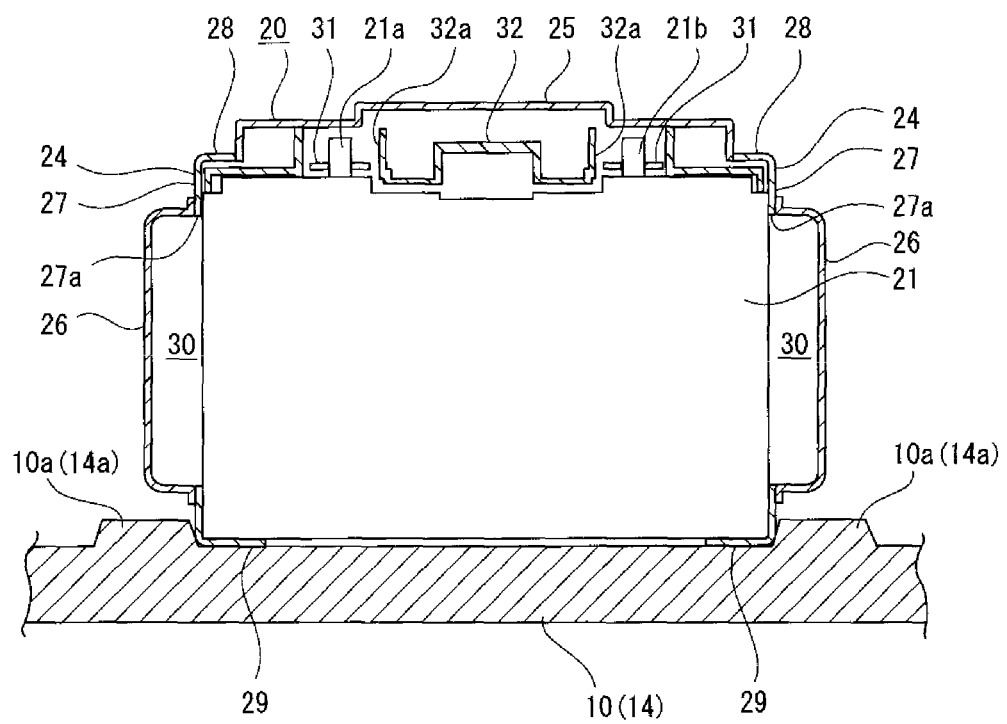
FIG. 7 is a cross-sectional view illustrating a state in which the battery module is disposed.

The battery module 3 has a cell cover 20 and a plurality of battery cells 21, 21, . . . that are arranged in the front and rear direction in the cell cover 20 (see FIGS. 6 and 7).

The cell cover 20 has a front surface 22 that faces in the front and rear direction, a rear surface 23 that is positioned on the rear side of the front surface 22 and faces in the front and rear direction, side surfaces 24 and 24 that are positioned so as to be spaced apart from each other in the left and right direction, a top surface 25 that faces in the vertical direction, and chamber formation units 26 and 26 that are attached to the side surfaces 24 and 24.

The side surfaces 24 and 24 have attachment surfaces 27 and 27 that face in the left and right direction, upper protruded surfaces 28 and 28 that are protruded from the upper edges of the attachment surfaces 27 and 27 in a direction in which they approach each other in the left and right direction, and lower protruded surfaces 29 and 29 that are protruded from the lower edges of the attachment surfaces 27 and 27 in a direction in which they approach each other in the left and right direction. An opening 27a that extends through the attachment surface 27 in the left and right direction is formed in a portion of the attachment surface 27 other than its outer periphery.

The chamber formation unit 26 is formed into a box-like shape having openings on its side and one of the front and the rear, and an opening edge of the chamber formation unit 26 in the left and right direction is attached to the outer periphery of the attachment surface 27. By attaching the chamber formation units 26 and 26 to the outer peripheries of the attachment surfaces 27 and 27, spaces are formed on left and right sides in the cell cover 20, and these spaces are formed as chambers 30 and 30. The opening of one of the front and the rear of the chamber formation unit 26 is formed as a coupling opening 26a.

In both ends of the top surface 25, insertion holes 25a and 25a that extend through the top surface 25 in the vertical direction are formed.

Figure 8:
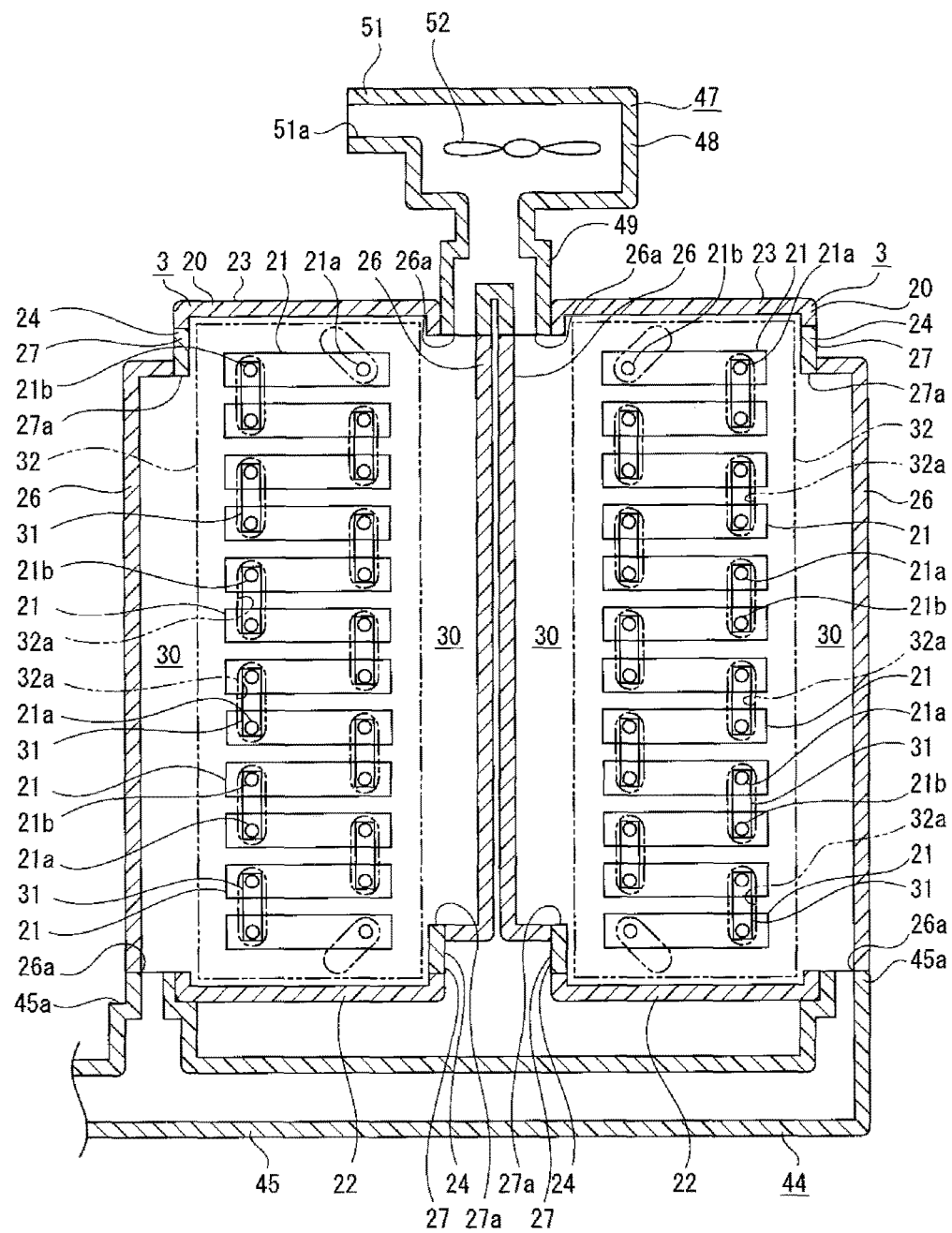
FIG. 8 is a conceptual view illustrating the battery module with a top surface detached together with ducts.

Each of the battery cells 21, 21, . . . is held by the cell cover 20 with the right and left ends of the battery cell 21 placed on the lower protruded surfaces 29 and 29 of the side surfaces 24 and 24, and the battery cells 21, 21, . . . are arranged at regular intervals in a state in which each battery cell 21 has small gaps at the front and the rear thereof (see FIGS. 7 and 8). A positive electrode terminal 21a and a negative electrode terminal 21b that are protruded upward are provided in the battery cell 21 so as to be spaced apart from each other in the left and right direction. The positive electrode terminals 21a, 21a, . . . and the negative electrode terminals 21b, 21b, . . . that are positioned adjacent to each other in the front and rear direction are connected to each other with connection plates 31, 31, . . . each having conductivity, and the battery cells 21, 21, . . . are thereby connected in series to each other. The connection plate 31 is fixed to the battery cells 21 and 21 with fastening members such as nuts or the like (not illustrated) screwed to the positive electrode terminal 21a and the negative electrode terminal 21b.

A holding plate 32 is attached to the upper surfaces of the battery cells 21, 21, . . . below the top surfaces 25. Disposition holes 32a, 32a, . . . that extend in the front and rear direction are formed in the holding plate 32 so as to be spaced part from each other in the front and rear direction and in the left and right direction. The positive electrode terminal 21a and the negative electrode terminal 21b of the battery cells 21 and 21 that are positioned adjacent to each other in the front and rear direction, and the connection plate 31 that connects the positive electrode terminal 21a and the negative electrode terminal 21b to each other are disposed in the disposition hole 32a.

One battery cell 21 of the battery module 3 that is accommodated in the upper accommodation unit 4 and is positioned in the upper tier is connected to one battery cell 21 of the battery module 3 that is accommodated in the lower accommodation unit 5 and is positioned in the lower tier with a vertical bus bar 33 (see FIG. 3).

A plug sensor box 34 and a junction box 35 are accommodated in left and right ends of the upper accommodation unit 4 of the accommodation case 2 (see FIGS. 2 and 3). In addition, a battery control unit 36 that controls the entire onboard battery 1 and a charge box 37 in which components necessary for charging are mounted are disposed in the lower accommodation unit 5 of the accommodation case 2.

A predetermined connection plug and a predetermined sensor are disposed in the plug sensor box 34.

The junction box 35 has a cabinet 38 formed into a rectangular shape and control components 39, 39, . . . that are disposed in the cabinet 38 and control the current and the like. As the control components 39, 39, . . . , for example, a relay, a fuse, a connector terminal, and the like are provided. One ends of cables 40 and 40 passing through the cable insertion holes 7c and 7c in the upper front wall 7 are connected with the junction box 35, and the junction box 35 is connected to a power supply circuit (inverter) (not illustrated) mounted below the floor of the vehicle with the cables 40 and 40.

Note that a positive relay connected with a positive electrode power supply line and a negative relay connected with a negative electrode power supply line are provided in the junction box 35, and at least one of the positive relay and the negative rely is preferably accommodated in the lower accommodation unit 5.

The battery modules 3, 3, . . . in the upper tier are accommodated between the plug sensor box 34 and the junction box 35 in the upper accommodation unit 4. In addition, the battery modules 3 and 3 in the lower tier are accommodated between the battery control unit 36 and the charge box 37 in the lower accommodation unit 5.

As described above, in the state in which the battery modules 3, 3, . . . , the plug sensor box 34, the junction box 35, the battery control unit 36 and the charge box 37 are accommodated in the accommodation case 2, the battery cell 21 of the battery module 3 positioned adjacent to the plug sensor box 34 is connected to the plug sensor box 34 with a first connection bus bar 41, and the battery cell 21 of the battery module 3 positioned adjacent to the junction box 35 is connected to the junction box 35 with a second connection bus bar 42. One end of the first connection bus bar 41 and one end of the second connection bus bar 42 are inserted into the insertion holes 25a and 25a formed in the top surfaces 25 and 25 of the battery modules 3 and 3, and are connected with the positive electrode terminals 21a and 21a or the negative electrode terminals 21b and 21b of the battery cells 21 and 21.

In addition, the battery cells 21, 21, . . . of the adjacent battery modules 3, 3, . . . are connected to each other with direct current connection bus bars 43, 43, . . . . Both ends of the direct current connection bus bars 43, 43, . . . are inserted into the insertion holes 25a, 25a, . . . formed in the top surfaces 25, 25, . . . of the battery modules 3, 3, . . . , and are connected with the positive electrode terminals 21a, 21a, . . . or the negative electrode terminals 21b, 21b, . . . of the battery cells 21, 21, . . . .

Note that the plug sensor box 34, the junction box 35 and the charge box 37 are connected to predetermined portions of the battery control unit 36 or the like with electric wires and bus bars.

Intake ducts 44 and 44 are provided on the front surface side of the battery modules 3, 3, . . . so as to be arranged in the left and right direction (see FIGS. 2 and 3). The intake duct 44 has an intake unit 45 that extends in the left and right direction and a lower introduction unit 46 that is protruded downward from one end of the intake unit 45.

Upper couplers 45a and 45a that are protruded rearward from one end and a middle portion of the intake unit 45 in the left and right direction are provided in the intake unit 45. An intake opening 45b is formed in the other end of the intake unit 45.

A lower coupler 46a that is protruded rearward from the lower end of the lower introduction unit 46 is provided in the lower introduction unit 46.

In the intake ducts 44 and 44, the upper couplers 45a, 45a, . . . are inserted into the duct insertion holes 7b, 7b, and 7b formed in the upper front wall 7, and the rear ends of the upper couplers 45a, 45a, . . . are coupled to the front ends of the chamber formation units 26, 26, . . . in the battery modules 3, 3, . . . in the upper tier that are arranged in the left and right direction (see FIG. 8). In addition, in the intake ducts 44 and 44, the lower couplers 46a and 46a are inserted into the duct insertion hole 11b formed in the lower front wall 11, and the rear ends of the lower couplers 46a and 46a are coupled to the front ends of the chamber formation units 26 and 26 in the battery modules 3 and 3 in the lower tier that are arranged in the left and right direction.

Consequently, the intake ducts 44 and 44 communicate with the coupling openings 26a, 26a, . . . of the chamber formation units 26, 26, . . . , and cooling air taken in from the intake openings 45b and 45b is sent to chambers 30, 30, . . . formed in the battery modules 3, 3, . . . in the upper and lower tiers via the intake ducts 44 and 44. The cooling air sent to the chambers 30, 30, . . . is flown to the chambers 30, 30, . . . on the opposite side through gaps between the battery cells 21, 21, . . . .

On the rear surface side of the battery modules 3, 3, . . . , discharge ducts 47 and 47 are provided so as to be spaced apart from each other in the left and right direction (see FIGS. 2 and 3). The discharge duct 47 has a fan disposition unit 48 having a substantially circular shape, an upper coupling protrusion 49 and a lower coupling protrusion 50 that are protruded forward from the fan disposition unit 48, and a discharge unit 51 that is laterally protruded from the fan disposition unit 48. The front end of the upper coupling protrusion 49 is divided into two portions.

A cooling fan 52 is rotatably disposed in the fan disposition unit 48. The cooling fan 52 has the function of flowing the cooling air from the side of the upper coupling protrusion 49 and the lower coupling protrusions 50 to the side of the discharge unit 51 by the rotation of the cooling fan 52.

A discharge opening 51a is formed in the tip of the discharge unit 51.

In the discharge ducts 47 and 47, the upper coupling protrusions 49 and 49 are inserted into the duct insertion holes 8b and 8b formed in the upper rear wall 8, and the front ends of the upper coupling protrusions 49 and 49 are coupled to the rear ends of the chamber formation units 26, 26, . . . in the battery modules 3, 3, . . . in the upper tier that are arranged in the left and right direction (see FIG. 8). In addition, in the discharge ducts 47 and 47, the lower coupling protrusions 50 and 50 are inserted into the duct insertion holes 12b and 12b formed in the lower rear wall 12, and the front ends of the lower coupling protrusions 50 and 50 are coupled to the rear ends of the chamber formation units 26 and 26 in the battery modules 3 and 3 in the lower tier that are arranged in the left and right direction.

Consequently, the discharge ducts 47 and 47 communicate with the coupling openings 26*a*, 26*a*, . . . of the chamber formation units 26, 26, . . . , and the cooling air that has cooled the battery cells 21, 21, . . . is discharged from the discharge openings 51*a* and 51*a* of the discharge units 51 and 51 via the discharge ducts 47 and 47 through the chambers 30, 30, . . . .

The flow of the cooling air in the intake ducts 44 and 44, the battery modules 3, 3, . . . , and the discharge ducts 47 and 47 is forcibly carried out by the cooling fans 52 and 52, and the battery cells 21, 21, . . . are thereby cooled efficiently.

Figure 9:
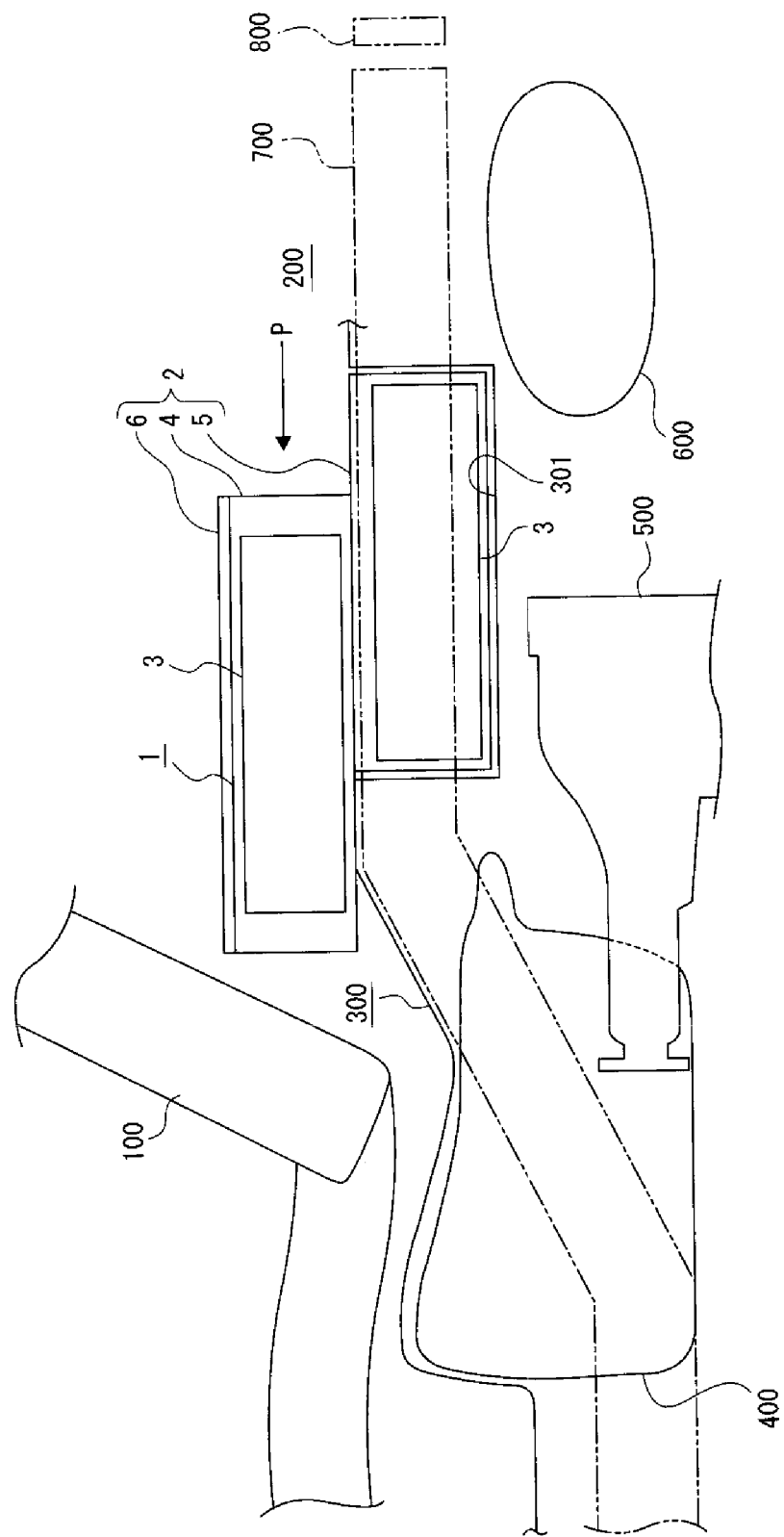
FIG. 9 is a conceptual view illustrating a state in which a load is applied to an upper tier of the onboard battery and the upper tier of the onboard battery is separated from a lower tier.

When another vehicle having a high height such as a truck or the like collides with the vehicle in which the onboard battery 1 configured as described above is mounted from the rear, the side frames and the bumper beam of another vehicle such as the truck or the like are present at positions higher than those of the side frames 700 and 700 and the bumper beam 800 of the vehicle in which the onboard battery 1 is mounted, and hence a load P resulting from an impact from another vehicle is applied to the upper tier of the onboard battery 1 (see FIG. 9).

When the load P resulting from the impact from another vehicle is applied to the upper tier of the onboard battery 1, the fragile portions 16*b*, 16*b*, . . . of the upper joints 16, 16, . . . are ruptured, the upper tier including the upper accommodation unit 4 is separated from the lower tier including the lower accommodation unit 5, and the upper tier is moved forward.

Consequently, the upper tier of the onboard battery 1 is separated from the lower tier and is moved forward, whereby the stress resulting from the impact is reduced, and the stress resulting from the impact on the upper tier is less likely to be applied to the lower tier of the onboard battery 1 with the separation of the upper tier so that the stress to the battery modules 3, 3, . . . accommodated in the accommodation case 2 is reduced and it is possible to prevent the occurrence of smoking or ignition resulting from damage to the battery modules 3, 3, . . . .

In addition, the onboard battery 1 is structured such that each of the upper accommodation unit 4 and the lower accommodation unit 5 has the hollow cross section, and hence the impact at the time of the collision of another vehicle is absorbed by the structure having the hollow cross section, and it is possible to achieve an improvement in impact resistance while securing a reduction in the weight of the onboard battery 1.

Further, as described above, at least one of the positive relay and the negative relay is accommodated in the lower accommodation unit 5, whereby it becomes possible to perform control in which the relay accommodated in the lower accommodation unit 5 is turned OFF when the upper tier including the upper accommodation unit 4 and the lower tier including the lower accommodation unit 5 are separated from each other, and it is possible to prevent electric shock by interrupting a circuit at the same time as the separation of the upper tier from the lower tier.

Furthermore, the upper joint 16 that couples the upper accommodation unit 4 and the lower accommodation unit 5 to each other is coupled to the lower accommodation unit 5 in a state in which the lower protruded coupler 19 is in contact with one of the front surface and the rear surface of the upper end in the lower accommodation unit 5, and hence the fragile portion 16*b* as the boundary between the middle portion 17 and the lower protruded coupler 19 is easily ruptured when the load is applied to the upper tier including the upper accommodation unit 4, and it is possible to easily separate the upper accommodation unit 4 and the lower accommodation unit 5 from each other when a specific load or more is applied to the upper accommodation unit 4.

Figure 10:
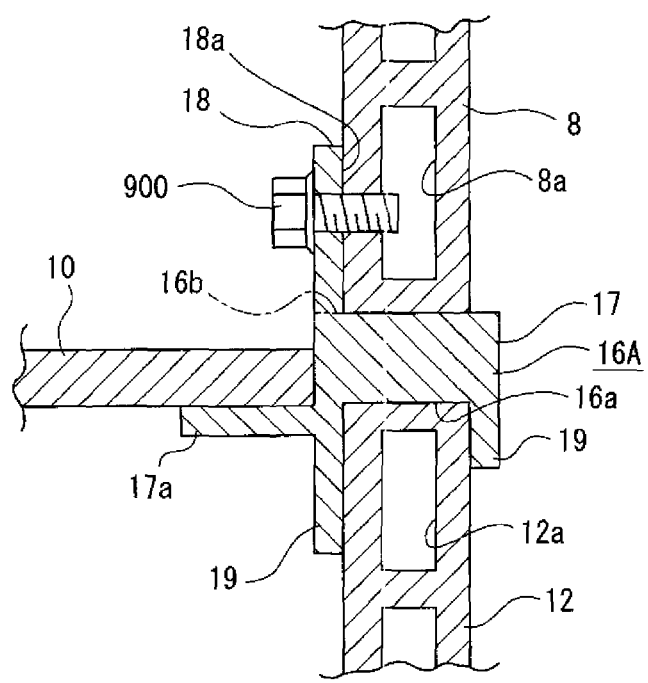
FIG. 10 is an enlarged cross-sectional view illustrating a state in which an upper protruded coupler of the upper joint is attached to the upper accommodation unit with an attachment screw.

Note that the foregoing has described the upper joint 16 that has the joint surface 19*a* in the lower protruded coupler 19 as an example, but, as illustrated in FIG. 10, the upper accommodation unit 4 and the lower accommodation unit 5 may also be coupled to each other with an upper joint 16A that has a joint surface 18*a* in the upper protruded coupler 18.

The upper joint 16A includes the middle portion 17, the upper protruded coupler 18, and the lower protruded couplers 19 and 19, the upper protruded coupler 18 is protruded upward from the inner end of the middle portion 17 in the front and rear direction or in the left and right direction, and the lower protruded couplers 19 and 19 are protruded downward from the outer end and the inner end of the middle portion 17 in the front and rear direction or in the left and right direction. The outer surface of the upper protruded coupler 18 is formed as the joint surface 18*a*. The fitting depression 16*a* that is opened downward is formed between the lower protruded couplers 19 and 19 in the upper joint 16. A boundary between the middle portion 17 and the upper protruded coupler 18 is formed as the fragile portion 16*b* having low strength.

The upper joint 16A is coupled to each of the upper front wall 7, the upper rear wall 8, and the upper side walls 9 and 9 with, e.g., the attachment screw 900 in a state in which the joint surface 18*a* of the upper protruded coupler 18 is in contact with each of the inner surfaces of the lower ends of the upper front wall 7, the upper rear wall 8, and the upper side walls 9 and 9 of the upper accommodation unit 4.

Note that the upper joint 16A may also be formed into a shape in which the upper protruded coupler 18 is protruded upward from the outer end of the middle portion 17 in the front and rear direction or in the left and right direction, and the joint surface 18*a* is in contact with each of the outer surfaces of the lower ends of the upper front wall 7, the upper rear wall 8, and the upper side walls 9 and 9 of the upper accommodation unit 4.

Since the upper joint 16A is coupled to the upper accommodation unit 4 in the state in which the upper protruded coupler 18 is in contact with one of the front surface and the rear surface of the lower end of the upper accommodation unit 4, the fragile portion 16*b* as a boundary between the middle portion 17 and the upper protruded coupler 18 is easily ruptured when the load is applied to the upper tier including the upper accommodation unit 4, and it is possible to easily separate the upper accommodation unit 4 and the lower accommodation unit 5 from each other when a specific load or more is applied to the upper accommodation unit 4.

Hereinbelow, individual modifications of the upper joint will be described (see FIGS. 11 to 15).

Note that, in the following description of the individual modifications of the upper joint, only components different from those of the upper joint 16 described above are described in detail, the same components as those of the upper joint 16 are designated by the same reference numerals as those of the upper joint 16, and description thereof will be omitted. Hereinbelow, the description will be given by using the upper joint that couples the upper rear wall 8 and the lower rear wall 12 to each other as an example.

Figure 11:
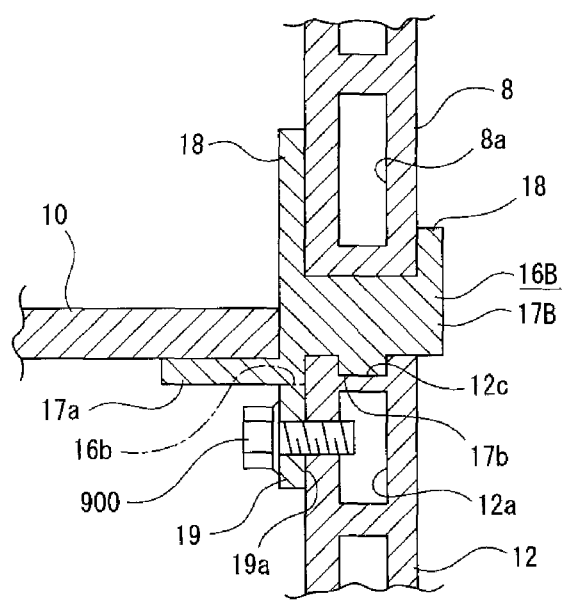
FIG. 11 is an enlarged cross-sectional view illustrating a first modification of the upper joint.

As illustrated in FIG. 11, an upper joint 16B according to a first modification includes a middle portion 17B, the upper protruded couplers 18 and 18, and the lower protruded coupler 19, and a positioning protrusion 17b that is protruded downward is provided in the middle portion 17B. In the case where the upper joint 16B is used, a positioning depression 12c that is opened upward is formed in the upper end of the lower rear wall 12, and the positioning protrusion 17b is fit in the positioning depression 12c.

Note that, similarly to the upper joint 16A, the upper protruded coupler 18 and the lower protruded couplers 19 and 19 may be provided in the upper joint 16B, and in this case, the positioning protrusion that is protruded upward is provided on the upper surface side of the middle portion 17B, and the positioning depression that is opened downward is formed in the lower end of the upper rear wall 8.

Since the upper joint 16B has the positioning protrusion 17b, it is possible to easily and reliably perform positioning relative to the lower rear wall 12.

In the upper joint 16B, a boundary between the middle portion 17B and the lower protruded coupler 19 is formed as the fragile portion 16b, and the fragile portion 16b can be ruptured when a large load is applied to the upper tier of the onboard battery 1.

Figure 12:
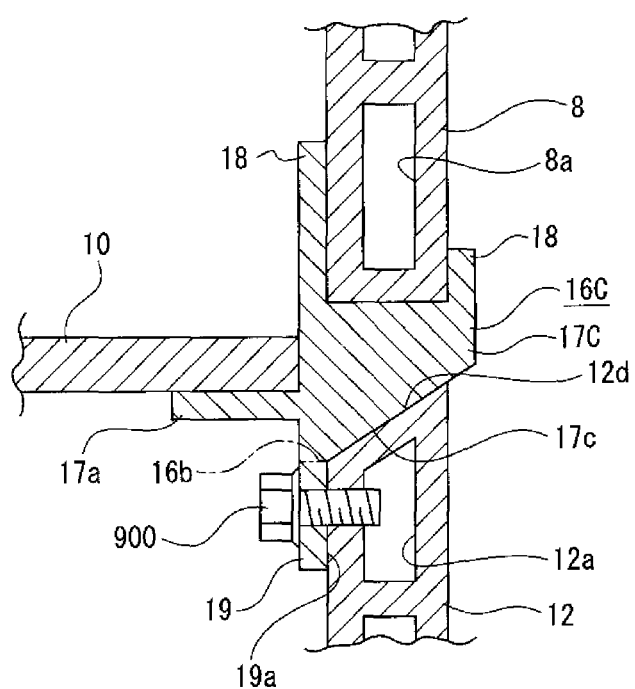
FIG. 12 is an enlarged cross-sectional view illustrating a second modification of the upper joint.

As illustrated in FIG. 12, an upper joint 16C according to a second modification includes a middle portion 17C, the upper protruded couplers 18 and 18, and the lower protruded coupler 19, and an inclined surface 17c that is inclined in the vertical direction is formed in the middle portion 17C. In the case where the upper joint 16C is used, an inclined surface 12d that is inclined in the vertical direction is formed in the upper end of the lower rear wall 12, and the inclined surface 17c is in contact with the inclined surface 12d.

Note that, similarly to the upper joint 16A, the upper protruded coupler 18 and the lower protruded couplers 19 and 19 may also be provided in the upper joint 16C, and in this case, the inclined surface is formed on the upper surface side of the middle portion 17C, and the inclined surface is formed in the lower end of the upper rear wall 8.

In the upper joint 16C, a boundary between the middle portion 17C and the lower protruded coupler 19 is formed as the fragile portion 16b, and the fragile portion 16b can be ruptured when a large load is applied to the upper tier of the onboard battery 1. In the upper joint 16C, since the inclined surface 17c is in contact with the inclined surface 12d, when the load is applied to the upper tier of the onboard battery 1, the inclined surface 17c and the inclined surface 12d slide relative to each other and the separation of the upper tier of the onboard battery 1 from the lower tier thereof is facilitated.

Next, a third modification, a fourth modification, and a fifth modification will be described (see FIGS. 13 to 15). Note that each of the third modification, the fourth modification, and the fifth modification is configured by coupling two upper joints.

Figure 13:
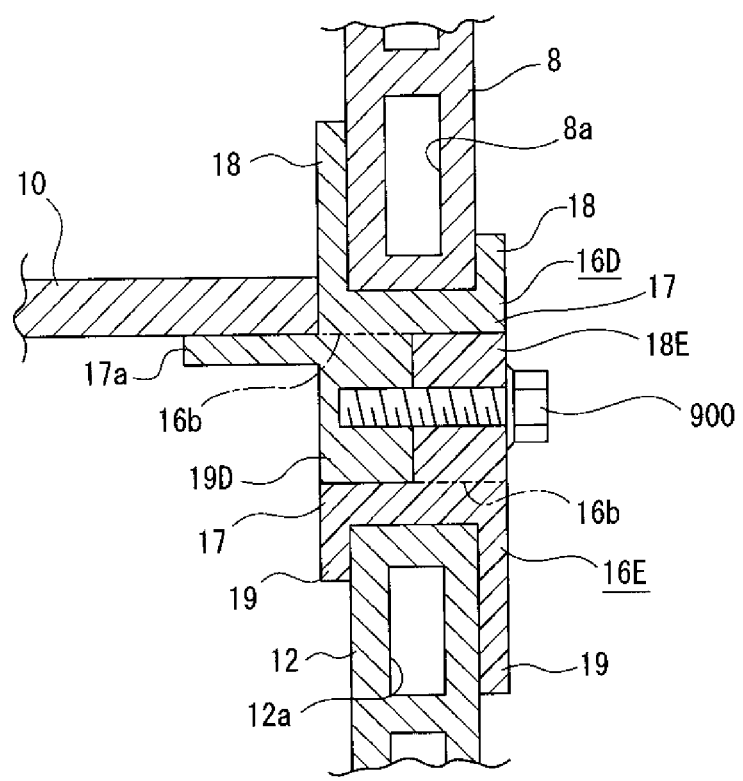
FIG. 13 is an enlarged cross-sectional view illustrating a third modification of the upper joint.

The third modification is configured by coupling a first upper joint 16D and a second upper joint 16E (see FIG. 13).

The first upper joint 16D includes the middle portion 17, the upper protruded couplers 18 and 18, and a lower protruded coupler 19D. The lower protruded coupler 19D is protruded downward from the middle portion 17. The second upper joint 16E includes the middle portion 17, an upper protruded coupler 18E, and the lower protruded couplers 19 and 19, and the receiving protrusion 17a is not provided in the middle portion 17. The upper protruded coupler 18E is protruded upward from the middle portion 17. In the first upper joint 16D and the second upper joint 16E, the lower protruded coupler 19D and the upper protruded coupler 18E are coupled to each other with, e.g., the attachment screw 900.

In the first upper joint 16D, a boundary between the middle portion 17 and the lower protruded coupler 19D is formed as the fragile portion 16b and, in the second upper joint 16E, a boundary between the middle portion 17 and the upper protruded coupler 18E is formed as the fragile portion 16b. Consequently, when a large load is applied to the upper tier of the onboard battery 1, the fragile portion 16b of the first upper joint 16D or the fragile portion 16b of the second upper joint 16E can be ruptured.

Thus, in the third modification, since the lower protruded coupler 19D of the first upper joint 16D and the upper protruded coupler 18E of the second upper joint 16E are coupled to each other, when the load is applied to the upper tier including the upper accommodation unit 4, the fragile portion 16b as the boundary between the middle portion 17 and the lower protruded coupler 19D or the fragile portion 16b as the boundary between the middle portion 17 and the upper protruded coupler 18E is easily ruptured, and it is possible to easily separate the upper accommodation unit 4 and the lower accommodation unit 5 from each other when a specific load or more is applied to the upper accommodation unit 4.

Figure 14:
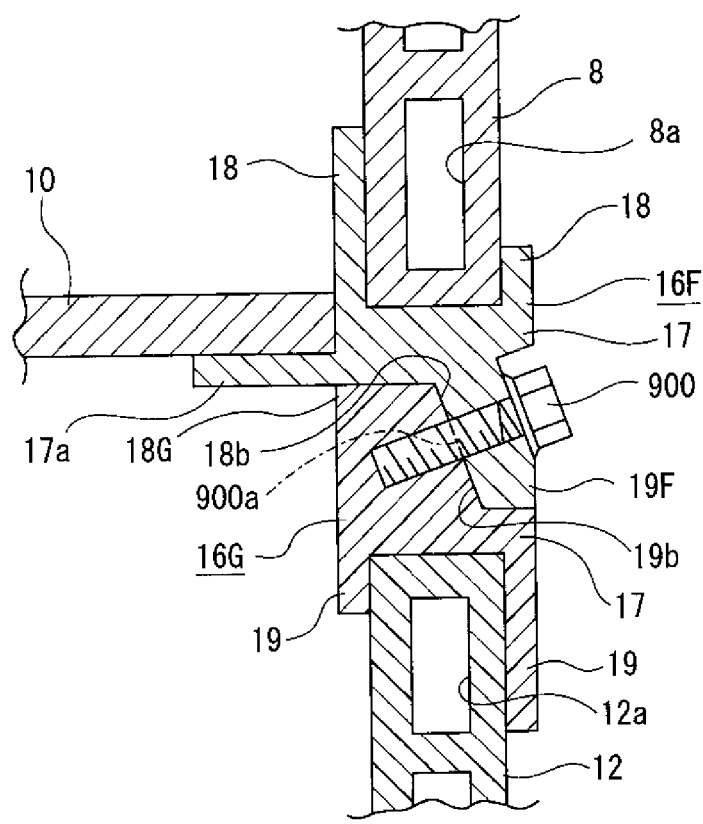
FIG. 14 is an enlarged cross-sectional view illustrating a fourth modification of the upper joint.

The fourth modification is configured by coupling a first upper joint 16F and a second upper joint 16G to each other (see FIG. 14).

The first upper joint 16F includes the middle portion 17, the upper protruded couplers 18 and 18, and a lower protruded coupler 19F. The lower protruded coupler 19F is protruded from the middle portion 17 obliquely downward and forward, and has an inclined surface 19b that is inclined in the front and rear direction. The second upper joint 16G includes the middle portion 17, an upper protruded coupler 18G, and the lower protruded couplers 19 and 19, and the receiving protrusion 17a is not provided in the middle portion 17. The upper protruded coupler 18G is protruded upward from the middle portion 17, and has an inclined surface 18b that is inclined in the front and rear direction. In the first upper joint 16F and the second upper joint 16G, the lower protruded coupler 19F and the upper protruded coupler 18G are coupled to each other with, e.g., the attachment screw 900 in a state in which the inclined surface 19b and the inclined surface 18b are in contact with each other.

When a large load is applied to the upper tier of the onboard battery 1, the inclined surface 19b and the inclined surface 18b slide relative to each other, and a portion 900a of the attachment screw 900 at a boundary surface between the lower protruded coupler 19F and the upper protruded coupler 18G can be ruptured.

Thus, in the fourth modification, since the lower protruded coupler 19F and the upper protruded coupler 18G are coupled to each other in the state in which the inclined surface 19b of the first upper joint 16F and the inclined surface 18b of the second upper joint 16G are in contact with each other, the lower protruded coupler 19F and the upper protruded coupler 18G easily slide relative to each other at the inclined surface 19b and the inclined surface 18b, the fragile portion 900a of the attachment screw 900 is easily ruptured when the load is applied to the upper tier including the upper accommodation unit 4, and it is possible to easily separate the upper accommodation unit 4 and the lower accommodation unit 5 from each other when a specific load or more is applied to the upper accommodation unit 4.

Figure 15:
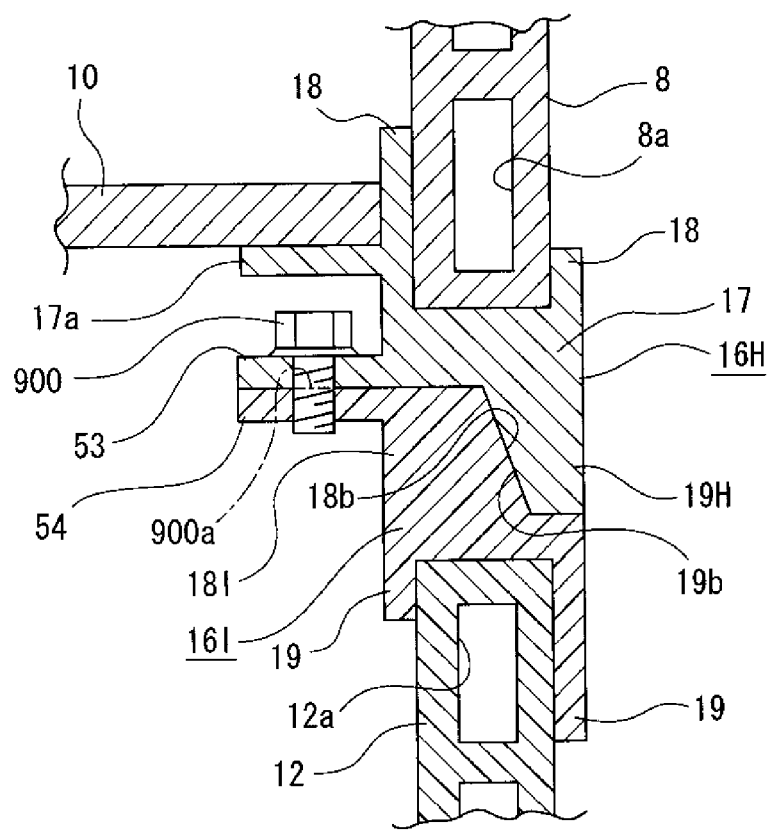
FIG. 15 is an enlarged cross-sectional view illustrating a fifth modification of the upper joint.

The fifth modification is configured by coupling a first upper joint 16H and a second upper joint 16I to each other (see FIG. 15).

The first upper joint 16H includes the middle portion 17, the upper protruded couplers 18 and 18, a lower protruded coupler 19H, and a middle protruded coupler 53. The lower protruded coupler 19H is protruded downward from the middle portion 17, and has the inclined surface 19b that is inclined in the front and rear direction. The middle protruded coupler 53 is protruded horizontally from the middle portion 17.

The second upper joint 16I includes the middle portion 17, an upper protruded coupler 181, the lower protruded couplers 19 and 19, and a middle protruded coupler 54, and the receiving protrusion 17a is not provided in the middle portion 17. The upper protruded coupler 181 is protruded upward from the middle portion 17, and has the inclined surface 18b that is inclined in the front and rear direction. The middle protruded coupler 54 is protruded horizontally from the upper protruded coupler 18.

In the first upper joint 16H and the second upper joint 16I, the middle protruded coupler 53 and the middle protruded coupler 54 are coupled to each other with, e.g., the attachment screw 900 in a state in which the inclined surface 19b and the inclined surface 18b are in contact with each other.

When a large load is applied to the upper tier of the onboard battery 1, the incline surface 19b and the inclined surface 18b slide relative to each other, and the portion 900a of the attachment screw 900 at a boundary surface between the middle protruded coupler 53 and the middle protruded coupler 54 can be ruptured.

Thus, in the fifth modification, since the middle protruded coupler 53 and the middle protruded coupler 54 are coupled to each other in the state in which the inclined surface 19b of the first upper joint 16H and the inclined surface 18b of the second upper joint 16I are in contact with each other, the lower protruded coupler 19H and the upper protruded coupler 181 easily slide relative to each other at the inclined surface 19b and the inclined surface 18b, the fragile portion 900a of the attachment screw 900 is easily ruptured when the load is applied to the upper tier including the upper accommodation unit 4, and it is possible to easily separate the upper accommodation unit 4 and the lower accommodation unit 5 from each other when a specific load or more is applied to the upper accommodation unit 4.

The invention claimed is:

1. An onboard battery comprising:
   an accommodation case that has an upper accommodation unit and a lower accommodation unit separable from the upper accommodation unit;
   battery modules each having at least one battery cell, the upper accommodation unit accommodating at least one of the battery module, and the lower accommodation unit accommodating at least another one of the battery module; and
   at least one joint that is positioned between the upper accommodation unit and the lower accommodation unit and that is configured to join the upper accommodation unit to the lower accommodation unit in such a manner as to overlap the upper accommodation unit with the lower accommodation unit in a top-bottom direction of the accommodation case, wherein
   when a predetermined load or more is applied to the upper accommodation unit, a stress acts on the at least one joint such that the upper accommodation unit and the lower accommodation unit are separated from each other, and the upper accommodation unit is moved away from the lower accommodation unit.

2. The onboard battery according to claim 1, wherein one of a pair of side frames of a vehicle equipped with the onboard battery is positioned on a left side of the lower accommodation unit, and the other one of the pair of the side frames of the vehicle is positioned on a right side of the lower accommodation unit.

3. The onboard battery according to claim 1, wherein each of the upper accommodation unit and the lower accommodation unit is structured to have a hollow cross section having a plurality of cavities.

4. The onboard battery according to claim 2, wherein each of the upper accommodation unit and the lower accommodation unit is structured to have a hollow cross section having a plurality of cavities.

5. The onboard battery according to claim 1, wherein
   the at least one joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion,
   the at least one upper protruded coupler is coupled to a lower end of the upper accommodation unit, and
   the at least one lower protruded coupler is coupled to the lower accommodation unit so as to be in contact with either one of a front surface and a rear surface of an upper end of the lower accommodation unit.

6. The onboard battery according to claim 2, wherein
   the at least one joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion,
   the at least one upper protruded coupler is coupled to a lower end of the upper accommodation unit, and
   the at least one lower protruded coupler is coupled to the lower accommodation unit so as to be in contact with either one of a front surface and a rear surface of an upper end of the lower accommodation unit.

7. The onboard battery according to claim 1, wherein
   the at least one joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion,
   the at least one lower protruded coupler is coupled to the upper end of the lower accommodation unit, and
   the at least one upper protruded coupler is coupled to the upper accommodation unit so as to be in contact with either one of a front surface and a rear surface of the lower end of the upper accommodation unit.

8. The onboard battery according to claim 2, wherein
   the at least one joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion, the at least one lower protruded coupler is coupled to the upper end of the lower accommodation unit, and the at least one upper protruded coupler is coupled to the upper accommodation unit so as to be in contact with either one of a front surface and a rear surface of the lower end of the upper accommodation unit.

9. The onboard battery according to claim 1, wherein the at least one joint comprises at least one first joint and at least one second joint, the at least one first joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion, the at least one second joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion, the at least one upper protruded coupler of the at least one first joint is coupled to the lower end of the upper accommodation unit, the at least one lower protruded coupler of the at least one second joint is coupled to the upper end of the lower accommodation unit, and the at least one lower protruded coupler of the at least one first joint and the at least one upper protruded coupler of the at least one second joint are coupled to each other in a front and rear direction.

10. The onboard battery according to claim 2, wherein the at least one joint comprises at least one first joint and at least one second joint, the at least one first joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion, the at least one second joint has at least one middle portion that is positioned between the upper accommodation unit and the lower accommodation unit, at least one upper protruded coupler that is protruded upward from the at least one middle portion, and at least one lower protruded coupler that is protruded downward from the at least one middle portion, the at least one upper protruded coupler of the at least one first joint is coupled to the lower end of the upper accommodation unit, the at least one lower protruded coupler of the at least one second joint is coupled to the upper end of the lower accommodation unit, and the at least one lower protruded coupler of the at least one first joint and the at least one upper protruded coupler of the at least one second joint are coupled to each other in a front and rear direction.

11. The onboard battery according to claim 1, wherein the at least one joint comprises at least one first joint and at least one second joint, the at least one first joint has at least one middle portion that is positioned between the upper accommodation unit and the lower accommodation unit, at least one upper protruded coupler that is protruded upward from the at least one middle portion, at least one lower protruded coupler that is protruded downward from the at least one middle portion, and at least one middle protruded coupler that is protruded horizontally from the at least one middle portion, the at least one second joint has at least one middle portion that is positioned between the upper accommodation unit and the lower accommodation unit, at least one upper protruded coupler that is protruded upward from the at least one middle portion, at least one lower protruded coupler that is protruded downward from the at least one middle portion, and at least one middle protruded coupler that is protruded horizontally from the at least one upper protruded coupler, the at least one upper protruded coupler of the at least one first joint is coupled to the lower end of the upper accommodation unit, the at least one lower protruded coupler of the at least one second joint is coupled to the upper end of the lower accommodation unit, and the at least one middle protruded coupler of the at least one first joint and the at least one middle protruded coupler of the at least one second joint are coupled to each other in a vertical direction.

12. The onboard battery according to claim 2, wherein the at least one joint comprises at least one first joint and at least one second joint, the at least one first joint has at least one middle portion that is positioned between the upper accommodation unit and the lower accommodation unit, at least one upper protruded coupler that is protruded upward from the at least one middle portion, at least one lower protruded coupler that is protruded downward from the at least one middle portion, and at least one middle protruded coupler that is protruded horizontally from the at least one middle portion, the at least one second joint has at least one middle portion that is positioned between the upper accommodation unit and the lower accommodation unit, at least one upper protruded coupler that is protruded upward from the at least one middle portion, at least one lower protruded coupler that is protruded downward from the at least one middle portion, and at least one middle protruded coupler that is protruded horizontally from the-upper protruded coupler, the at least one upper protruded coupler of the at least one first joint is coupled to the lower end of the upper accommodation unit, the at least one lower protruded coupler of the at least one second joint is coupled to the upper end of the lower accommodation unit, and the at least one middle protruded coupler of the at least one first joint and the at least one middle protruded coupler of the at least one second joint are coupled to each other in a vertical direction.

13. The onboard battery according to claim 9, wherein an inclined surface that is inclined in the vertical direction is formed in each of the at least one first joint and the at least one second joint, and the at least one first joint and the at least one second joint are coupled to each other in a state in which the inclined surface of the at least one first joint and the inclined surface of the at least one second joint are in contact with each other.

14. The onboard battery according to claim 10, wherein
an inclined surface that is inclined in the vertical direction is formed in each of the at least one first joint and the at least one second joint, and
the at least one first joint and the at least one second joint are coupled to each other in a state in which the inclined surface of the at least one first joint and the inclined surface of the at least one second joint are in contact with each other.

15. The onboard battery according to claim 11, wherein
an inclined surface that is inclined in the vertical direction is formed in each of the at least one first joint and the at least one second joint, and
the at least one first joint and the at least one second joint are coupled to each other in a state in which the inclined surface of the at least one first joint and the inclined surface of the at least one second joint are in contact with each other.

16. The onboard battery according to claim 12, wherein
an inclined surface that is inclined in the vertical direction is formed in each of the at least one first joint and the at least one second joint, and
the at least one first joint and the at least one second joint are coupled to each other in a state in which the inclined surface of the at least one first joint and the inclined surface of the at least one second joint are in contact with each other.

\* \* \* \* \*